(12) United States Patent
Kurosawa

(10) Patent No.: US 7,705,518 B2
(45) Date of Patent: Apr. 27, 2010

(54) ULTRASONIC MOTOR

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 211 days.

(21) Appl. No.: 11/865,848

(22) Filed: Oct. 2, 2007

(65) Prior Publication Data

US 2008/0297003 A1    Dec. 4, 2008

(30) Foreign Application Priority Data

Oct. 5, 2006    (JP) .................... 2006-273541

(51) Int. Cl.
    *H02N 2/10*    (2006.01)
(52) U.S. Cl. .................... 310/323.11; 310/323.08
(58) Field of Classification Search ....................
        310/323.01–323.03, 323.05, 323.06, 323.08,
                              310/323.09, 323.11
    See application file for complete search history.

(56) References Cited

U.S. PATENT DOCUMENTS

| | | | | |
|---|---|---|---|---|
| 4,939,494 A | * | 7/1990 | Masuda et al. ............... | 336/96 |
| 5,013,956 A | * | 5/1991 | Kurozumi et al. ...... | 310/323.11 |
| 5,066,884 A | * | 11/1991 | Takagi et al. ........... | 310/323.05 |
| 5,557,157 A | * | 9/1996 | Shirasaki ............... | 310/323.11 |
| 5,578,887 A | * | 11/1996 | Shirasaki ............... | 310/323.08 |
| 5,949,178 A | * | 9/1999 | Tamai et al. ........... | 310/323.01 |
| 6,107,724 A | * | 8/2000 | Tamai et al. ........... | 310/323.11 |
| 6,320,299 B1 | * | 11/2001 | Kitani et al. ........... | 310/323.04 |
| 7,365,475 B2 | * | 4/2008 | Kurosawa .............. | 310/323.09 |
| 2007/0057596 A1 | | 3/2007 | Kurosawa | |
| 2007/0085448 A1 | | 4/2007 | Kurosawa | |
| 2007/0145859 A1 | | 6/2007 | Kurosawa | |
| 2007/0188051 A1 | * | 8/2007 | Kobayashi et al. ...... | 310/323.11 |
| 2008/0150394 A1 | * | 6/2008 | Kurosawa .............. | 310/323.09 |

FOREIGN PATENT DOCUMENTS

JP    9 98587    4/1997

OTHER PUBLICATIONS

English language Abstract of JP 9-98587, Date: Apr. 8, 2009.

\* cited by examiner

*Primary Examiner*—Thomas M Dougherty
(74) *Attorney, Agent, or Firm*—Greenblum & Bernstein, P.L.C.

(57) ABSTRACT

An ultrasonic motor includes a stator that includes a comb body with a plurality of circumferentially-arranged comb-like projections and a piezoelectric body integrally mounted on the comb body, a rotor rotatable with respect to the stator, the rotor having a contact surface that establishes pressure contact with the stator, and a resin film formed with predetermined hardness on the contact surface of the rotor, the resin film containing a solid lubricant.

7 Claims, 5 Drawing Sheets

ROTATIONAL CHARACTERISTICS OF ULTRASONIC MOTORS WITH DIFFERENT RESIN FILMS

| | | AREA ON WHICH RESIN FILM IS FORMED | | NUMBER OF DURABLE CYCLES | NUMBER OF REVOLUTIONS AT RESONANT FREQUENCY UNDER PREDETERMINED LOAD | ROTATION NOISE AT RESONANT FREQUENCY | RISING CHARACTERISTICS |
|---|---|---|---|---|---|---|---|
| | | PRESSURE CONTACT SURFACE OF ROTOR | SURFACE OF COMB BODY | | | | |
| (a) | APPLIED RESIN | | | over 5000 | 200 | GENERATED | NG |
| | SOLID LUBRICANT | | | | | | |
| | PENCIL HARDNESS | | | | | | |
| (b) | APPLIED RESIN | | PHENOL EPOXY | about 1000 | 200 | NOT GENERATED | NG |
| | SOLID LUBRICANT | | PTFE, FEP | | | | |
| | PENCIL HARDNESS | | B | | | | |
| (c) | APPLIED RESIN | PHENOL EPOXY | | about 3000 | 150 | NOT GENERATED | GOOD |
| | SOLID LUBRICANT | PTFE, FEP | | | | | |
| | PENCIL HARDNESS | B | | | | | |
| (d) | APPLIED RESIN | POLYAMIDE-IMIDE | | over 5000 | 200 | NOT GENERATED | GOOD |
| | SOLID LUBRICANT | PTFE, GRAPHITE | | | | | |
| | PENCIL HARDNESS | F | | | | | |
| (e) | APPLIED RESIN | POLYAMIDE-IMIDE | | over 5000 | 200 | NOT GENERATED | GOOD |
| | SOLID LUBRICANT | PTFE, MoS₂ | | | | | |
| | PENCIL HARDNESS | F | | | | | |

{RESIN FILM WITH THICKNESS OF 40 μm, FORMED BY APPLICATION}

ROTATIONAL CHARACTERISTICS OF ULTRASONIC MOTORS WITH DIFFERENT RESIN FILMS

| | AREA ON WHICH RESIN FILM IS FORMED | | NUMBER OF DURABLE CYCLES | NUMBER OF REVOLUTIONS AT RESONANT FREQUENCY UNDER PREDETERMINED LOAD | ROTATION NOISE AT RESONANT FREQUENCY | RISING CHARACTERISTICS |
|---|---|---|---|---|---|---|
| | PRESSURE CONTACT SURFACE OF ROTOR | SURFACE OF COMB BODY | | | | |
| (a) | APPLIED RESIN | | over 5000 | 200 | GENERATED | NG |
| | SOLID LUBRICANT | | | | | |
| | PENCIL HARDNESS | | | | | |
| (b) | APPLIED RESIN: PHENOL EPOXY | APPLIED RESIN: PHENOL EPOXY | about 1000 | 200 | NOT GENERATED | NG |
| | SOLID LUBRICANT: PTFE, FEP | SOLID LUBRICANT: PTFE, FEP | | | | |
| | PENCIL HARDNESS: B | PENCIL HARDNESS: B | | | | |
| (c) | APPLIED RESIN: PHENOL EPOXY | | about 3000 | 150 | NOT GENERATED | GOOD |
| | SOLID LUBRICANT: PTFE, FEP | | | | | |
| | PENCIL HARDNESS: B | | | | | |
| (d) | APPLIED RESIN: POLYAMIDE-IMIDE | | over 5000 | 200 | NOT GENERATED | GOOD |
| | SOLID LUBRICANT: PTFE, GRAPHITE | | | | | |
| | PENCIL HARDNESS: F | | | | | |
| (e) | APPLIED RESIN: POLYAMIDE-IMIDE | | over 5000 | 200 | NOT GENERATED | GOOD |
| | SOLID LUBRICANT: PTFE, MoS2 | | | | | |
| | PENCIL HARDNESS: F | | | | | |

(RESIN FILM WITH THICKNESS OF 40 μm, FORMED BY APPLICATION)

FIG. 5

ULTRASONIC MOTOR

BACKGROUND OF THE INVENTION

The present invention relates to an ultrasonic motor, particularly, to an ultrasonic motor with rotational characteristics and durability thereof being improved and a manufacturing cost thereof being reduced.

An ultrasonic motor is configured with a stator that includes a piezoelectric body with a plurality of polarized piezoelectric segments circumferentially arranged and a rotatable disc-shaped or annular rotor in contact with the stator under a predetermined pressure. In the ultrasonic motor, the piezoelectric body of the stator is vibrated with high frequency voltage being applied thereto. The induced vibration of the piezoelectric body is enhanced in a circumferential direction of the stator by a comb body provided integrally to the piezoelectric body such that the comb body is driven to induce a traveling vibration wave in the circumferential direction. Thereby, the rotor, which frictionally engages with the piezoelectric body, can be rotated around an axis thereof. The comb body has a function of enlarging amplitude of the vibration of the piezoelectric body. However, since the amplitude is generally one micrometer to three micrometers, the comb body is required to be in close contact with the rotor evenly in the circumferential and radial directions of the stator so as to improve rotational efficiency of the rotor (i.e., rotational energy of the rotor to vibration energy of the stator). Therefore, in a conventional ultrasonic motor, when machining surfaces of the comb body and the rotor that contact with each other, high machining accuracy is required so as to regulate profile irregularities and deviations from flatness thereof within several micrometers. In addition, accuracy on the same order is required with respect to a degree of parallelization between the comb body and rotor to be assembled.

In order to meet the aforementioned requirements, a technique is proposed in which there is formed on the surface of the rotor that faces the comb body a slider made of polymer resin that can easily be machined to control the profile irregularity and deviation from flatness (e.g., Japanese Patent Provisional Publication No. HEI 9-98587, hereinafter, simply referred to as '587 Publication). In '587 Publication, a technique is further proposed in which the slider is formed from conductive organic material or conductive organic material is applied onto a surface of the slider so as to prevent wear of the slider to be accelerated by static electricity generated on the slider and to prevent rotational efficiency of the rotor from being reduced due to dust adhering to the slider by the electrostatic force.

In '587 Publication, the slider, which is an additional component different from the rotor, is employed as a component of the ultrasonic motor. It leads to increase of the number of components of the ultrasonic motor and needs a further process of attaching the slider to the rotor. Thereby, a manufacturing cost of the ultrasonic motor is increased. Especially when the conductive organic material is applied onto the surface of the slider, an additional applying process is needed, and the manufacturing cost of the ultrasonic motor is further increased. Addition, in '587 Publication, since thickness of the slider or the applied material layer is not discussed, it is not clear whether rotational characteristics required for the ultrasonic motor, such as durability, the number of revolutions in a loaded state, a level of a rotation noise, and rising characteristics, are improved.

SUMMARY OF THE INVENTION

The present invention is advantageous in that there can be provided an ultrasonic motor that makes it possible to improve rotational characteristics of a rotor and reduce a manufacturing cost thereof.

According to an aspect of the present invention, there is provided an ultrasonic motor, which includes a stator that includes a comb body with a plurality of circumferentially-arranged comb-like projections and a piezoelectric body integrally mounted on the comb body, a rotor rotatable with respect to the stator, the rotor having a contact surface that establishes pressure contact with the stator, and a resin film formed with predetermined hardness on the contact surface of the rotor, the resin film containing a solid lubricant.

Optionally, the resin film may be formed from one of phenol epoxy resin and polyamide-imide resin.

Optionally, the resin film may be formed with the predetermined hardness more than pencil hardness "F."

Optionally, the solid lubricant contained in the resin film may include at least one of molybdenum disulfide (MoS2), fluorocarbon resin, and graphite.

Still optionally, the fluorocarbon resin may include at least one of polytetrafluoroethylene (PTFE), perfluoroalkoxy polymer resin (PFA), and fluorinated ethylene-propylene (FEP).

Further, optionally, the fluorocarbon resin may be configured as mixture of at least two of polytetrafluoroethylene (PTFE), perfluoroalkoxy polymer resin (PFA), and fluorinated ethylene-propylene (FEP).

Optionally, the resin film may be formed by being applied onto the contact surface of the rotor.

Optionally, the resin film may be formed with a thickness of 1 micrometer to 100 micrometers.

Preferably, the resin film may be formed with a thickness of 30 micrometers to 40 micrometers.

Optionally, the contact surface of the rotor may be formed in an annular shape with a radial width smaller than that of the comb body.

Optionally, the rotor and stator may be formed from metal material.

According to another aspect of the present invention, there is provided an ultrasonic motor, which includes a stator that includes a comb body with a plurality of circumferentially-arranged comb-like projections and a piezoelectric body integrally mounted on the comb body, a rotor rotatable with respect to the stator, the rotor having a contact surface that establishes pressure contact with the stator, and a resin film formed from one of phenol epoxy resin and polyamide-imide resin with predetermined hardness more than pencil hardness "F" on the contact surface of the rotor, the resin film containing a solid lubricant.

BRIEF DESCRIPTION OF THE ACCOMPANYING DRAWINGS

Figure 3:
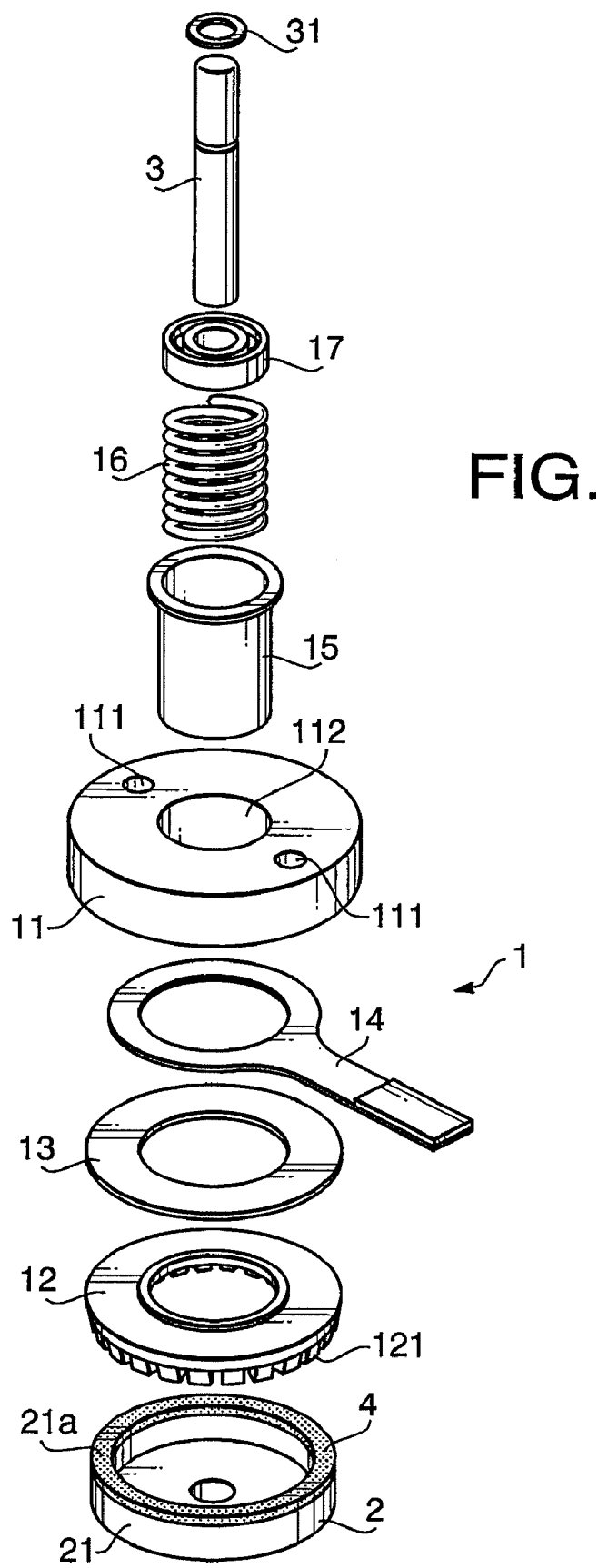

FIG. 3 partially shows an exploded perspective view of the ultrasonic motor in the embodiment according to one or more aspects of the present invention.

Figure 4:
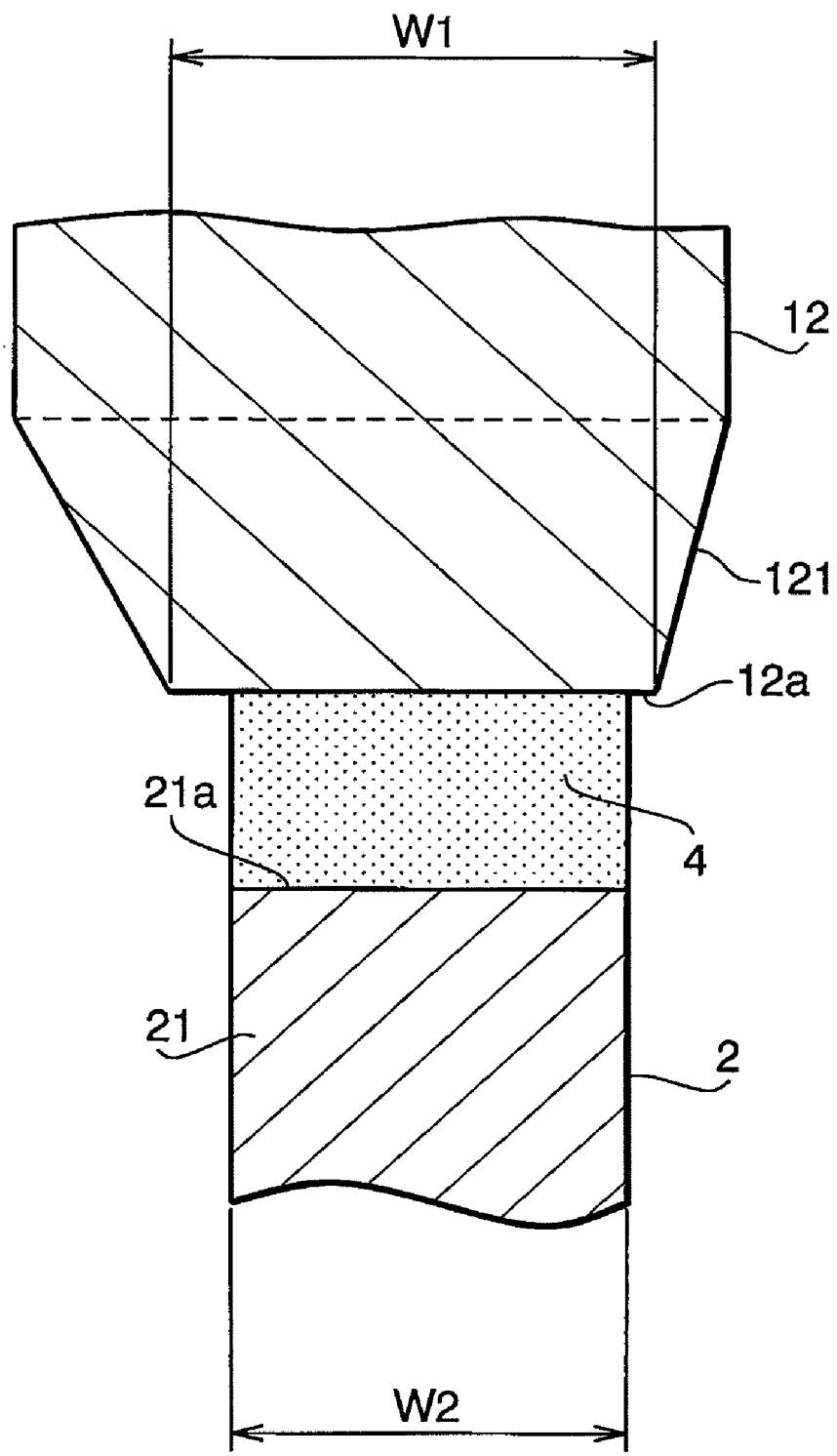

FIG. 4 is an enlarged cross-sectional view of a region where a comb body establishes pressure contact with a rotor via a resin film in the embodiment according to one or more aspects of the present invention.

FIG. 5 is a table showing rotational characteristics of ultrasonic motors with different resin films.

DETAILED DESCRIPTION OF THE EMBODIMENTS

Figure 1:
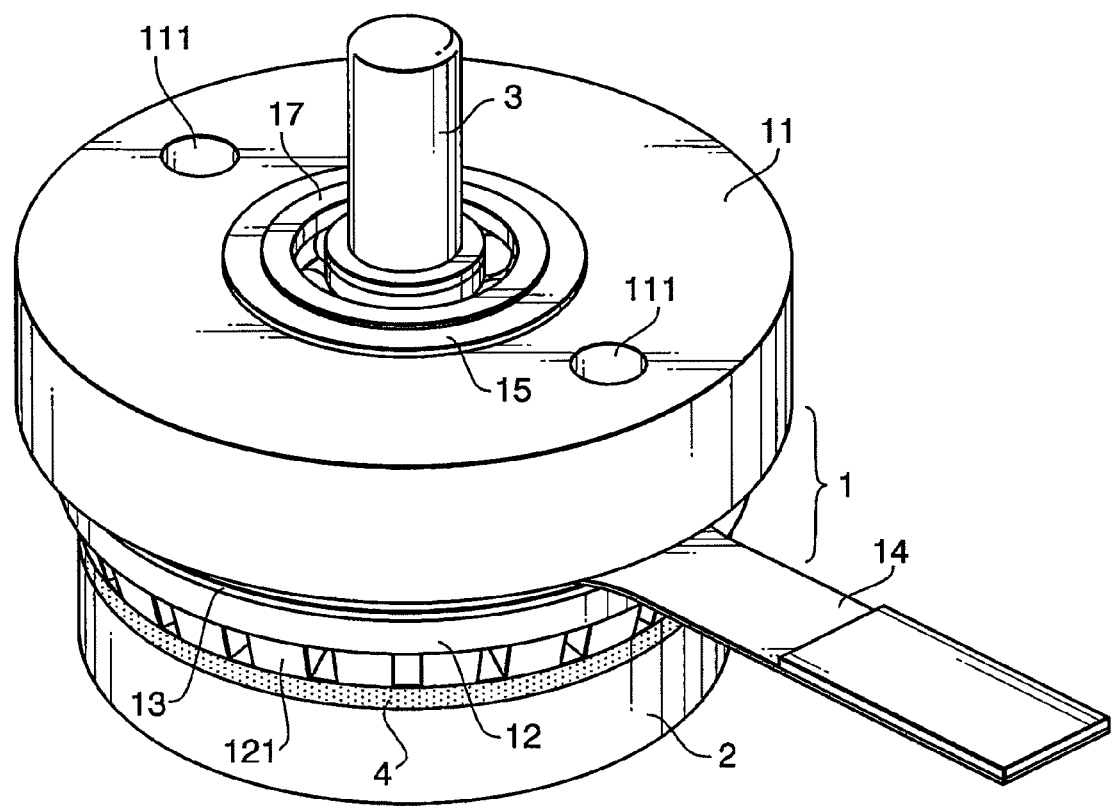
FIG. 1 is an external perspective view of an ultrasonic motor in an embodiment according to one or more aspects of the present invention.
Figure 2:
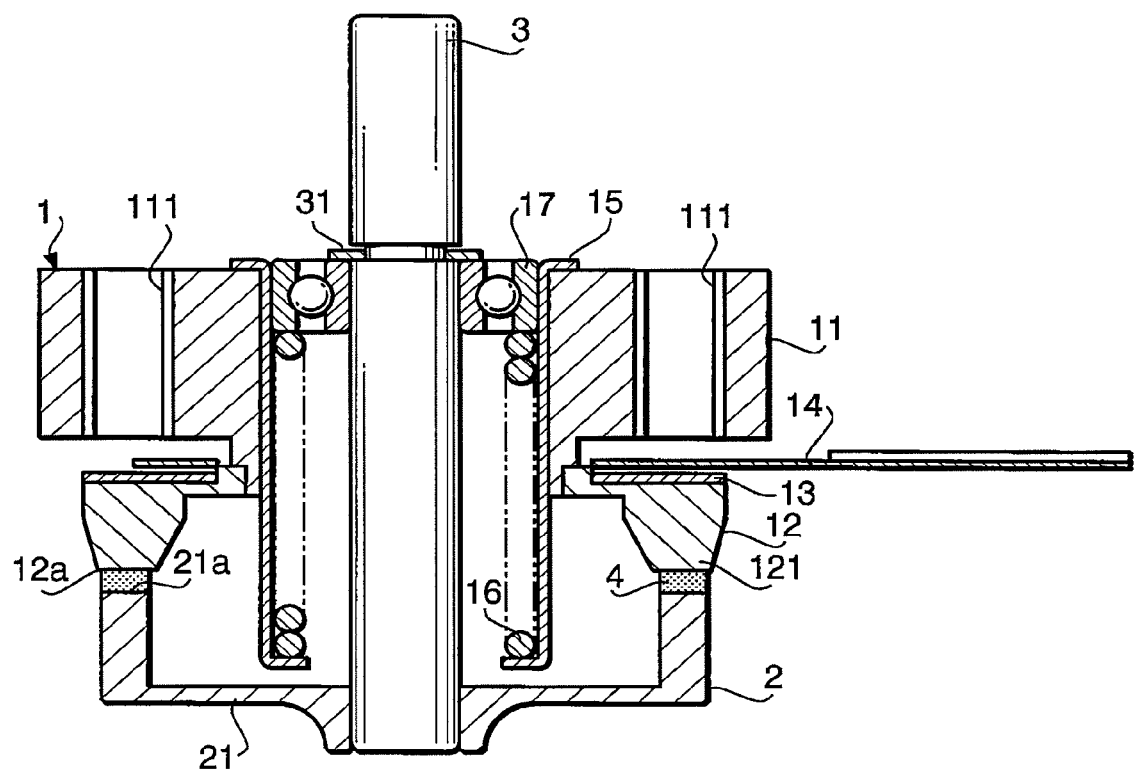
FIG. 2 is a cross-sectional view of the ultrasonic motor along a plane including a center axis of a rotating shaft thereof in the embodiment according to one or more aspects of the present invention.

An embodiment according to aspects of the present invention will be described with reference to the accompanying drawings. FIG. 1 is an external perspective view of an ultrasonic motor in an embodiment. FIG. 2 is a cross-sectional view of the ultrasonic motor along a plane including a center axis of a rotating shaft 3 thereof. FIG. 3 partially shows an exploded perspective view of the ultrasonic motor. As shown in FIGS. 1 to 3, there is integrally provided under an annular pedestal 11 having mounting holes 111 for mounting the motor, a short-cylinder-shaped comb body 12 that includes a plurality of comb-like projections 121 circumferentially arranged. In addition, there is integrally mounted on the comb body 12 an annular thin-plate-shaped piezoelectric body 13 that includes a plurality of polarized segments circumferentially arranged to correspond to the comb-like projections 121, respectively. A stator 1 is configured with the piezoelectric body 13 and comb body 12. Further, high frequency voltage can be applied to the piezoelectric body 13 via a flexible board 14. A shaft hole 112 is opened at a center of the pedestal 11, and a cylinder-shaped bush 15 is fixed on an inner circumferential surface of the shaft hole 112. In addition, a ball bearing 17 is provided inside the bush 15, rotatably supporting the rotating shaft 3. A washer 31 prevents the rotating shaft 3 from pulling out of the ball bearing 17. A rotor 2 is attached to a lower end portion of the rotating shaft 3. The rotor 2 has a below-mentioned resin film 4 formed on an upper end surface of a peripheral wall 21 thereof, i.e., a pressure contact surface 21a. The resin film 4 is formed in a short cylinder shape to contact with a surface of the comb body 12, namely, a surface 12a of the comb-like projections 121. Furthermore, a compression coil spring 16 is provided between a lower end portion of the bush 15 and the ball bearing 17 in an axial direction. By an elastic force of the compression coil spring 16 in the axial direction, the ball bearing 17 and the rotating shaft 3 supported by the ball bearing 17 are biased in an upper direction, and the pressure contact surface 21a of the peripheral wall 21 of the rotor 2 is biased toward the surface 12a of the comb body 12 of the stator 1.

FIG. 4 is an enlarged cross-sectional view of a region where the surface 12a of the comb body 12 establishes pressure contact with the resin film 4 formed on the pressure contact surface 21a of the peripheral wall 21 of the rotor 2. A radial width W2 of the annular pressure contact surface 21a of the rotor 2 is smaller than a radial width W1 of the surface 12a of the comb body 12 of the stator 1. The rotor 2 is formed from Aluminum, while the stator 1 is formed from phosphor bronze. Further, the resin film 4 of a predetermined thickness is integrally formed on the pressure contact surface 21a of the rotor 2. The resin film 4 is formed from phenol epoxy resin or polyamide-imide resin, and contains at least one of solid lubricants such as molybdenum disulfide ($MoS_2$), fluorocarbon resin, and graphite. The fluorocarbon resin polytetrafluoroethylene (PTFE), perfluoroalkoxy polymer resin (PFA), and fluorinated ethylene-propylene (FEP), and any of them or a mixture of at least two of them can be employed as the fluorocarbon resin. In the embodiment, the resin film 4 is formed as an even film applied onto the pressure contact surface 21a of the rotor 2. The resin film 4 has a thickness of 1 micrometer to 100 micrometers (in this case, a thickness of 30 micrometers to 40 micrometers). In addition, the resin film 4 is configured to have a surface with pencil hardness more than "F" measured by a pencil hardness tester. The pencil hardness tester can represent a degree of hardness of a measured subject with an indicator such as "HB" and "B" that is determined as the softest hardness of which a pencil can make a scratch on a surface of the measured subject. The pencil hardness tester is configured to keep an angle and a pressing load of a pencil used for the test constant. An explanation, more detailed than the above, of the pencil hardness tester will be omitted.

In the ultrasonic motor of the embodiment, when a high frequency voltage is applied to the piezoelectric body 13 via the flexible board 14, the piezoelectric body 13 vibrates, and the comb body 12 configured integrally with the piezoelectric body 13 also vibrates such that the plurality of comb-like projections 121 circumferentially arranged are displaced in a circumferential direction. The pressure contact surface 21a of the rotor 2 establishes pressure contact with the surface 12a of the comb body 12 via the resin film 4 by the bias force of the compression coil spring 16. Therefore, the above pressure contact generates a friction force between a surface of the resin film 4 of the rotor 2 and the surface 12a of the comb body 12. By the friction force, the resin film 4, thereby, the rotor 2 configured integrally with the resin film 4 are moved in the circumferential direction, and the rotor 2 and the rotating shaft 3 supporting the rotor 2 are rotated. A rotating force of the rotating shaft 3 is conveyed outside via a gear (not shown) fixed to the rotating shaft 3.

At this time, the pressure contact surface 21a of the rotor 2 does not directly contact with the surface 12a of the comb body 12 of the stator 1, and the resin film 4 exists therebetween. Hence, since metal surfaces of the rotor 2 and stator 1 do not directly contact with each other, a quiet rotational operation can be performed with a rotation noise being reduced. In addition, as described above, the resin film 4 is formed from phenol epoxy resin or polyamide-imide resin, and contains solid lubricant therein. Thereby, buffered and well lubricated contact can be established between the rotor 2 and the stator 1. For this reason, preferable close contact can be established evenly in the circumferential and radial directions between the surface 12a of the comb body 12 and the pressure contact surface 21a of the rotor 2 (or the surface of the resin film 4). It results in excellent rotation efficiency of the rotor 2. Additionally, since the resin film 4 has pencil hardness more than "F", wear of the resin film 4 due to a rotational operation can be prevented, and a life cycle required for a device to which the ultrasonic motor is applied can be secured.

FIG. 5 is a table showing the number of durable cycles, the number of revolutions at a resonant frequency under a predetermined load, existence of the rotation noise, and the rising characteristics that are measured for the ultrasonic motor under each condition as a combination of a kind of the resin, solid lubricant, and pencil hardness of the resin film 4. Here, the "number of durable cycles" is defined with two clockwise (CW) revolutions plus two counterclockwise (CCW) revolutions for each cycle. The "number of durable cycles" represents the maximum number of cycles up to which the resin film 4 is maintained in a practical state and over which the resin film 4 is so worn as to be unpractical. The "number of revolutions at a resonant frequency under a predetermined load" is defined as the number of revolutions [rpm] attained when a predetermined load (in this case, a load of 30 [gf·cm]) is applied to the rotating shaft 3 of the ultrasonic motor being driven at a resonant frequency. The "existence of the rotation noise" is judged based on whether a rotation noise more than a predetermined level is generated from the ultrasonic motor being rotated at the resonant frequency, and judged to be "Nonexistence" in the case where the rotation noise is equal to or less than the predetermined level. The "rising characteristics" is judged to be "Good" in the case where the number of revolutions reaches a predetermined value instantly (within a predetermined time period) after getting the ultrasonic motor started. In this case, there are prepared as the ultrasonic motor according to the present invention ultrasonic motors (d) and (e) with resin films 4 of a pencil hardness "F" that are formed from polyamide-imide resin and contain different solid lubricants. Further, for the sake of comparison, there are prepared an ultrasonic motor (a) without the resin film 4, an ultrasonic motor (b) with a resin film 4 formed on the surface 12*a* of the comb body 12 of the stator 1, and an ultrasonic motor (c) with a resin film 4 of a pencil hardness "B" that does not meet the aforementioned requirement of a pencil hardness more than "F" for the resin film 4.

The measurement results represent that the ultrasonic motors (d) and (e) with the resin films 4 that meet the aforementioned requirements according to aspects of the present invention satisfy a predetermined criterion of any measured item. In other words, the ultrasonic motors (d) and (e) are quiet in a rotational operation and show excellent performances. The ultrasonic motor (a) without the resin film 4 generates a large rotation noise and does not satisfy the predetermined criterion of the rising characteristics. The ultrasonic motor (b) with the resin film 4 formed on the surface 12*a* of the comb body 12 of the stator 1 shows a low value for the number of durable cycles that implies it does not satisfy a required life cycle since a portion in pressure contact with the pressure contact surface 21*a* of the rotor 2 of the resin film 4 gets worn away faster than other portions due to the rotational operation. The ultrasonic motor (c) with the resin film 4 of a pencil hardness "B" shows satisfied results with respect to the rotation noise and the rising characteristics but shows undesirable low values for the number of durable cycles and the number of revolutions at the resonant frequency under the predetermined load because of the soft resin film 4 thereof.

The resin film 4 is set to have an appropriate thickness depending on characteristics such as the number of durable cycles, the number of revolutions at the resonant frequency under the predetermined load, existence of the rotation noise, and the rising characteristics that are required for a device to which the ultrasonic motor is applied. More specifically, since the resin film 4 is worn away such that the thickness thereof is reduced faster with increasing the number of revolutions of the ultrasonic motor, the resin film 4 is generally set to have a thickness of 1 micrometer to 100 micrometers in consideration of durability required for a common device. For a resin film 4 with a thickness less than 1 micrometer, the number of durable cycles is significantly low. Meanwhile, a resin film 4 with a thickness more than 100 micrometers has sufficient durability against the wear thereof. However, the thickness of 100 micrometers is meaningless for the resin film 4 in view of durability of the ball bearing 17 or other components. Further, it causes a problem that the resin film 4 is easy to peel off. In addition, a thin resin film 4 between the comb body 12 and the rotor 2 is desirable for increasing the number of revolutions at the resonant frequency under the predetermined load, while a thick resin film 4, which serves as a buffer film between the comb body 12 and the rotor 2, is preferred for reducing the rotation noise. According to various measurements, it has been clarified that the resin film 4 with a thickness of 30 micrometers to 40 micrometers can meet the requirements with respect to the number of revolutions at the resonant frequency under the predetermined load and the rotation noise.

The resin film 4 according to aspects of the present invention is not limited to the aforementioned films prepared for the measurement of which the results are shown in FIG. 5. It is needless to say that various sorts of modifications may be possible as far as they are within such a scope as not to extend beyond the essential teachings of the present invention. For example, the resin film 4 may be a film formed from a different kind of resin. In addition, the resin film 4 is not limited to a film with pencil hardness "F" as shown in FIG. 5 and may have pencil hardness "H" or "HB."

The present disclosure relates to the subject matter contained in Japanese Patent Application No. P2006-273541, filed on Oct. 5, 2006, which is expressly incorporated herein by reference in its entirety.

What is claimed is:

1. An ultrasonic motor, comprising:
 a stator that includes a comb body with a plurality of circumferentially-arranged comb-like projections and a piezoelectric body integrally mounted on the comb body;
 a rotor rotatable with respect to the stator, the rotor having a contact surface that establishes pressure contact with the stator; and
 a resin film formed with predetermined hardness on the contact surface of the rotor, the resin film containing a solid lubricant,
 wherein the resin film comprises one of:
  a resin film comprising a phenol epoxy resin, and a polytetrafluroethylene (PTFE) or fluorinated ethylene-propylene (FEP) solid lubricant, and having a pencil hardness of "B";
  a resin film comprising a polyamide-imide resin, and a PTFE or graphite solid lubricant, and having a pencil hardness of at least "F"; and
  a resin film comprising a polyamide-imide resin and a PTFE or molybdenum disulfide ($MoS_2$) solid lubricant, and having a pencil hardness of at least "F".

2. The ultrasonic motor according to claim 1, wherein the solid lubricant comprises a mixture of at least two of PTFE, perfluoroalkoxy polymer resin (PFA), and FEP.

3. The ultrasonic motor according to claim 1, wherein the resin film is formed by being applied onto the contact surface of the rotor.

4. The ultrasonic motor according to claim 1, wherein the resin film is formed with a thickness of 1 micrometer to 100 micrometers.

5. The ultrasonic motor according to claim 4, wherein the resin film is formed with a thickness of 30 micrometers to 40 micrometers.

6. The ultrasonic motor according to claim 1, wherein the contact surface of the rotor is formed in an annular shape with a radial width smaller than that of the comb body.

7. The ultrasonic motor according to claim 1, wherein the rotor and stator are formed from metal material.

\* \* \* \* \*